United States Patent Office 3,391,265
Patented July 2, 1968

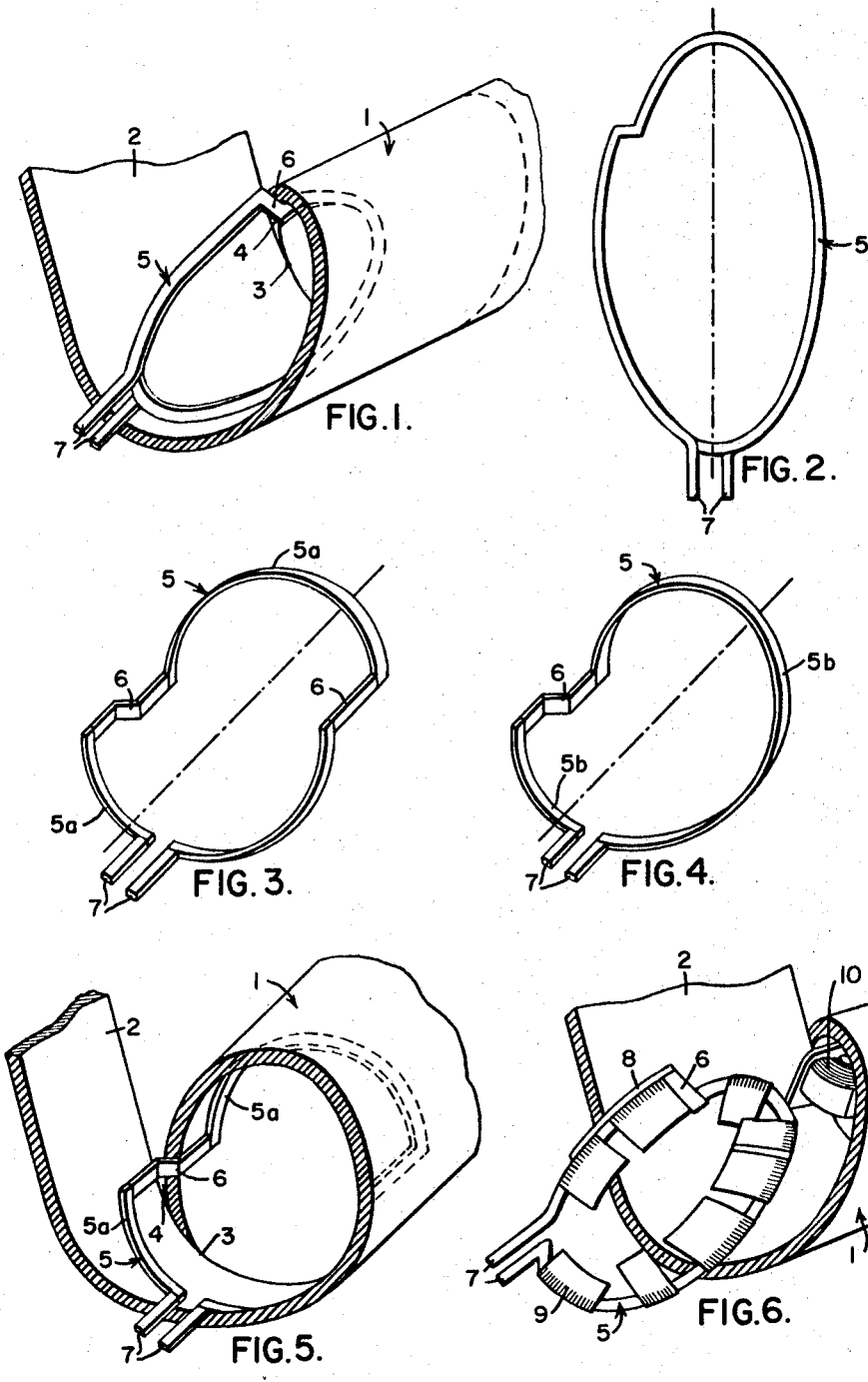

3,391,265
ELECTRICAL RESISTANCE SEAM WELDING APPARATUS
Rolf Esche, Erlangen, Germany, assignor to Siemens Aktiengesellschaft, a corporation of Germany
Filed Feb. 26, 1965, Ser. No. 435,536
Claims priority, application Germany, May 9, 1964, S 90,990
9 Claims. (Cl. 219—8.5)

ABSTRACT OF THE DISCLOSURE

Spiral tube welding apparatus in which the point of weld and its adjacent gap edges are heated by an internal inductor coil with at least one turn. The coil is adjacent the welding gap, perpendicular to it and parallel to the tube wall and incoming strip. The coil's projection on a plane perpendicular to the tube axis forms approximately a circle. The induced current in the tube in the vicinity of the coil flows perpendicularly to the welding gap. The coil may have in the vicinity of the weld gap a steplike offset extending radially from the tube to the incoming strip.

---

The present invention relates to electrical resistance seam welding apparatus, and more particularly to induction heating apparatus for welding a spiral seam to form a pipe or tube.

So far, for manufacture of pipes in which a metal strip is wound in a spiral and in which the edge of the incoming strip is welded to the free edge of the connecting turn of the strip, there are known various special methods and devices for welding of these edges together. Of importance among such methods, and devices are those involving use of electrical resistance welding and which work with low, medium or high frequency alternating current, whereby the edges of the metal strip which are to be welded are heated by an electric current and forced together.

In one of these electrical resistance welding methods the current is applied to the pipe material directly by means of a sliding contact in the vicinity of the edges which are to be welded. However, in such use of contacts very high requirements are made on the quality and uniformity of the transfer of the current from the contacts to the pipe material, and due to high current intensities erosion by burning often occurs on the material surface when it is even only a little unclean.

In another electrical resistance welding method as previously practiced a current is produced in the welded edges of the pipe by an inductor. The inductor has been arranged on the outside of the pipe along the welded edges up to the point of welding or directly in the weld gap between the incoming strip and the outer edge of the already wound up pipe, so arranged that a current is induced to flow along the edges of the strip up to the point of weld to heat these edges to the welding temperature. However, difficulties exist in accommodating an outside inductor because the incoming strip is guided at an angle to the pipe axis and pressure and guide rolls for forming the pipe are present, which limits the space available outside of the pipe for a favorable location of such inductor. In addition, a uniform coupling between the inductor and the pipe respective to the incoming strip can be obtained only with difficulties.

In view of the foregoing remarks, it is an object of the present invention to provide induction welding apparatus for spiral-seam pipe manufacture which obviates the above difficulties.

In the novel arrangement of the present invention, the point of weld and the edges of the gap in the vicinity of the point of weld are heated by an inside inductor in the form of an electrical coil with one or more turns, the coil conductor or conductors of which are, at least near the welding gap, perpendicular to it and parallel to the wall of the pipe and to the incoming strip. The coil is built and arranged so that its projection on a plane perpendicular to the pipe axis forms approximately a circle and there is induced in the walls of the wound pipe a current which flows in the vicinity of the inductor perpendicularly to the welding gap. In addition, in certain cases, the inductor, in the form of a coil have in the vicinity of the weld gap a step-like offset extending radially from the pipe to the incoming strip.

Other objects, features and advantages of the invention will become apparent from the following more detailed description of the invention, taken in connection with the accompanying drawing, in which:

FIGURE 1 shows in a perspective view a wound pipe with an inside inductor in operating position;

FIGS. 2, 3 and 4 represent in each case an example of a special embodiment of the inside inductor;

FIG. 5 shows the embodiment of the inductor of FIG. 3 in the operating position in a wound pipe; and FIG. 6 shows an inside inductor with iron return circuit pieces run out of the pipe as well as the wound pipe with an "impeder."

FIG. 1 shows a wound pipe 1, which is wound of a metal strip 2, for example a steel strip, in a form of a spiral. The inductor 5 is arranged inside of the pipe so that the side of the coil-like inductor facing the weld gap 4 is not brought directly to the point of welding 3, but it is located at a certain distance from the point of weld in the direction of the incoming metal strip. The position of the inductor with respect to the point of weld, and therefore the length of the not-yet-welded edges between the welding point 3 and the inductor 5, defined as the length of the weld gap 4, depends essentially on the wall thickness of the pipe and on the welding speed. The inductor of FIG. 1 is approximately elliptical and it is arranged so that the plane of the coil is perpendicular to welding gap. For an increased efficiency of the inductor, it is necessary to have a uniform coupling between the pipe, the incoming strip and the inductor, at least in the vicinity of the weld gap. Because the flat incoming strip at some distance from the point of weld is at a certain radial spacing from the edge of the pipe, it is of advantage if there is arranged in the inductor coil 5 an offset portion 6 in the form of a step extending radially between the pipe and the incoming strip to assure a uniform coupling distance between the pipe, the incoming strip and the inductor.

FIG. 2 shows a view of the multi-turn approximately elliptically shaped inductor 5 included in the FIG. 1 arrangement. The coil can be made with one turn of the several turns as indicated in the drawing. The coil ends 7 are connected to a transformer, for example to a middle or high frequency transformer, or for example also to a high frequency generator.

FIG. 3 shows an alternate configuration of the inductor. Here the inductor consists of two half-circle-like coil sections 5a which are offset axially and which are connected in the axial direction by two electrically conducting spacers 6. This exemplification has, against the one shown in FIG. 2, the advantage that it can be made easier.

FIG. 4 shows another, somewhat modified, exemplification of the inductor 5. This inductor consists of a spiral part 5b of a single turn coil, portions of which are radially offset and connected by an electrically conducting spacer 6 extending in a radial and in an axial direction.

FIG. 5 shows again in perspective view the arrangement of the inductor 5 of FIG. 3 disposed in operative position in the wound pipe.

FIG. 6 shows once more a single-turn inductor 5 shaped in accord with the FIG. 2 configuration, in a position of removal from its adjacent operative position. However, here there are arranged on the inductor 5 iron return circuit pieces 9 in behalf of increasing the impedance of the pipe walls and furthermore to prevent in this way the induction current from closing through the rear side of the pipe remote from the weld gap. In addition, there is arranged an "impeder" 10 which runs along the weld gap from the inductor coil to the point of weld when such inductor occupies its operative position. This "impeder" consists: in case of use of middle-frequency inductor energizing current, of a packet of laminations in which the laminations are arranged parallelly to the gap and perpendicularly to the axis of the pipe; in the case of use of high frequency, of a ferrite core. In addition, it is possible that in the vicinity of the weld gap the iron return circuit pieces 19 and the "impeder" 10 can be of single-piece construction.

By use of the inductor 5 of the present invention there is produced in the trailing end of the wound pipe 1 and in the incoming strip 2 an induction current which is parallel to the inductor and, due to the arrangement and configuration of the latter, flows perpendicularly to the weld gap 4 and from there in the edges of the weld gap to and from the point of weld. The "impeder" shown in FIG. 6 has thereby mostly the duty to concentrate the current along the edges of gap 4 in the vicinity between the offset portion 6 of the inductor 5 and the point of welding 3.

The speed of the welding depends primarily on the amount of energy which is supplied to the inductor. By sufficient energization of the inductor edges of the weld gap 4 between the offset portion 6 of inductor 5 and the point 3 welding are brought up to sufficiently high temperature, so that the edges weld tight together when the metal parts are pressed against each other. If a higher welding speed is desired, then the length of the weld gap 4 also is to be increased. However, in order to be able to use the same inductor coil for various welding speeds, an amplification piece 8 shown in FIG. 6 can be arranged on the inductor for disposition parallel to the weld gap edge of the incoming strip in behalf of maintaining a constant coupling distance between the inductor 5 and such strip.

It has been shown, that in case of the described new construction and arrangement of the inductor 5, welding of pipes up to very large diameters and wall thickness is possible.

While there has been shown and described in the foregoing several particular illustrative embodiments of the invention, it will be understood that it is intended that the appended claims do cover all modifications as fall within the true spirit and scope of the invention.

I claim:

1. In apparatus for resistance welding of spiral seams on wound pipe in which an edge of radially incoming strip is welded to an edge of an axially outgoing wound pipe at a weld point located at the terminus of a weld gap formed between such edges, the combination therewith of an internal inductor coil extending into the interior of said wound pipe constructed and arranged to extend close to and parallel with the radially incoming strip and the interior wall of the axially outgoing wound pipe with an approximately circular configuration as viewed along the axis of such pipe, said internal inductor coil having at least a conductor portion in the region of the weld gap which extends perpendicularly to such gap, whereby an induction current is produced in the wall of the wound pipe which flows to the weld gap in a perpendicular direction.

2. The combination as set forth in claim 1, further characterized in that the edges of the radially incoming strip and the axially outgoing wound pipe at the weld gap are radially offset, and the inductor coil extends transversely across such gap and has a corresponding radial steplike offset portion at such gap-crossover location.

3. The combination as set forth in claim 1, further characterized in that the inductor coil is of a generally elliptical shape and its longer axis extends generally perpendicular to the weld gap at an angle to the axis of the pipe.

4. The combination as set forth in claim 1, further characterized in that the inductor coil comprises two half-circle parts which are offset in the axial direction and interconnected by two electrically conductive spacers extending in the axial direction.

5. The combination as set forth in claim 1, further characterized in that the inductor coil comprises a portion shaped like a one-turn spiral and an electrically conductive spacer portion extending in the axial direction and interconnecting opposite ends of said one-turn spiral-shaped portion.

6. The combination as set forth in claim 1, further characterized in the inclusion of an impeder disposed along the weld gap between the inductor coil and the weld point.

7. The combination as set forth in claim 1, further characterized in the inclusion of an impeder disposed along the weld gap between the inductor coil and the weld point, said impeder comprising a packet of laminations extending parallel to such gap and perpendicular to the axis of the wound pipe.

8. The combination as set forth in claim 1, further characterized in the inclusion of an impeder disposed along the weld gap between the inductor coil and the weld point, said impeder comprising a ferrite core.

9. The combination as set forth in claim 1, further characterized in that iron return circuit pieces are arranged on the inductor coil on its side facing away from the wound pipe.

References Cited

UNITED STATES PATENTS

| 2,666,831 | 1/1954 | Seulen et al. | 219—8.5 |
| 2,647,981 | 8/1953 | Wögerbauer | 219—59 |
| 3,171,940 | 3/1965 | Kohler | 219—8.5 |

RICHARD M. WOOD, *Primary Examiner.*

B. A. STEIN, *Assistant Examiner.*